US005965669A

United States Patent [19]
Cavallaro et al.

[11] Patent Number: 5,965,669
[45] Date of Patent: Oct. 12, 1999

[54] MULTI-LAYER GOLF BALL AND COMPOSITION

[75] Inventors: Christopher Cavallaro, Attleboro; Murali Rajagopalan, South Dartmouth; Herbert C. Boehm, Norwell; Kevin M. Harris, New Bedford, all of Mass.; Samuel A. Pasqua, Jr., Bristol, R.I.

[73] Assignee: Acushnet Company, Fairhaven, Mass.

[21] Appl. No.: 08/972,041

[22] Filed: Nov. 17, 1997

Related U.S. Application Data

[63] Continuation-in-part of application No. 08/482,522, Jun. 7, 1995, Pat. No. 5,688,191.

[51] Int. Cl.⁶ .......................... A63B 37/12; A63B 37/06
[52] U.S. Cl. .................. 525/221; 525/196; 525/201; 473/372; 473/373; 473/374; 473/385
[58] Field of Search .................... 525/196, 201, 525/221; 473/372, 373, 374, 385

[56] References Cited

U.S. PATENT DOCUMENTS

| | | | |
|---|---|---|---|
| 696,353 | 3/1902 | Richards . | |
| 696,366 | 3/1902 | Kempshall . | |
| 4,431,193 | 2/1984 | Nesbitt | 273/235 R |
| 4,625,964 | 12/1986 | Yamada | 273/62 |
| 4,650,193 | 3/1987 | Molitor et al. | 273/228 |
| 4,714,253 | 12/1987 | Nakahara et al. | 273/228 |
| 4,781,383 | 11/1988 | Kamada et al. | 273/228 |
| 4,848,770 | 7/1989 | Shama | 273/228 |
| 4,863,167 | 9/1989 | Matsuki et al. | 273/62 |
| 4,919,434 | 4/1990 | Saito | 273/235 R |
| 5,002,281 | 3/1991 | Nakahara et al. | 273/220 |
| 5,026,067 | 6/1991 | Gentiluomo | 273/220 |
| 5,072,944 | 12/1991 | Nakahara et al. | 273/220 |
| 5,104,126 | 4/1992 | Gentiluomo | 273/238 |
| 5,150,906 | 9/1992 | Molitor et al. | 273/220 |
| 5,184,828 | 2/1993 | Kim et al. | 273/228 |
| 5,253,871 | 10/1993 | Viollaz | 273/228 |
| 5,314,187 | 5/1994 | Proudfit | 273/235 R |
| 5,439,227 | 8/1995 | Egashira et al. | 273/223 |
| 5,467,994 | 11/1995 | Moriyama et al. | 273/222 |
| 5,553,852 | 9/1996 | Higuchi et al. | 473/373 |
| 5,556,098 | 9/1996 | Higuchi et al. | 473/373 |
| 5,656,695 | 8/1997 | Endo | 525/196 |
| 5,688,191 | 11/1997 | Cavallaro et al. | 473/373 |
| 5,688,869 | 11/1997 | Sullivan | 525/196 |
| 5,721,304 | 2/1998 | Pasqua | 524/433 |

FOREIGN PATENT DOCUMENTS

| | | |
|---|---|---|
| 2 260 546 | 4/1993 | United Kingdom . |
| 2267908 | 12/1993 | United Kingdom . |
| 2278609 | 12/1994 | United Kingdom . |
| 95/00212 | 1/1995 | WIPO . |

*Primary Examiner*—David Buttner
*Attorney, Agent, or Firm*—Pennie & Edmonds LLP

[57] ABSTRACT

A multi-layer golf ball comprising a core, a cover layer and a mantle layer disposed between the core and the cover. The cover layer consists essentially of at least a first and a second ionomer resin. The first resin is a copolymer of 16 to 35% by weight of an alpha, beta-unsaturated carboxylic acid and 84 to 65% by weight of an olefin, wherein about 10 to about 90% of the carboxyl groups of the copolymer are neutralized with a metal ion. The second resin is a terpolymer of 9 to 12% by weight of an alpha, beta-unsaturated carboxylic acid, 1 to 50% by weight n-alkyl acrylate or methacrylate and 38 to 90% by weight of an olefin, wherein about 10 to about 90% of the carboxyl groups of the terpolymer are neutralized with a metal ion. The mantle layer comprises a thermoplastic material, said thermoplastic material consisting essentially of polyetherester block copolymer.

23 Claims, 1 Drawing Sheet

MULTI-LAYER GOLF BALL AND COMPOSITION

This application is a continuation-in-part of U.S. patent application Ser. No. 08/482,522, filed Jun. 7, 1995, now U.S. Pat. No. 5,688,191, issued Nov. 18, 1997.

FIELD OF THE INVENTION

This invention relates generally to golf balls, and more specifically, to a multi-layer golf ball. In particular, this invention relates to a golf ball having a core, a cover and one or more mantle layers disposed between the core and cover. This invention is also directed to the compositions used for the manufacture of golf ball cores, mantle layers and covers for the multi-layer golf balls. The multi-layer golf balls of the present invention have been found to provide the distance and durability characteristics approaching that of a conventional two-piece ball while also providing good feel.

BACKGROUND OF THE INVENTION

Conventional golf balls can be divided into two general types or groups: two-piece balls and wound balls (also know as three-piece balls). The difference in play characteristics resulting from these different types of constructions can be quite significant.

Balls having a two-piece construction are generally most popular with the average recreational golfer because they provide a very durable ball while also providing maximum distance. Two-piece balls are made with a single solid core, usually made of a crosslinked rubber, which is encased by a cover material. Typically the solid core is made of polybutadiene which is chemically crosslinked with zinc diacrylate and/or similar crosslinking agents and is covered by a tough, cut-proof blended cover. The cover is generally a material such as SURLYN®, which is a trademark for an ionomer resin produced by DuPont. The combination of the core and cover materials provide a "hard" ball that is virtually indestructible by golfers. Further, such a combination imparts a high initial velocity to the ball which results in improved distance. Because these materials are very rigid, two-piece balls have a hard "feel" when struck with a club. Likewise, due to their hardness, these balls have a relatively low spin rate which provides greater distance.

At the present time, the wound ball remains the preferred ball of the more advanced players due to its spin and feel characteristics. Wound balls typically have either a solid rubber or liquid center core around which many yards of a stretched elastic thread or yarn are wound. The wound core is then covered with a durable cover material such as a SURLYN® or similar material or a softer cover such as Balata or polyurethane. Wound balls are generally softer and provide more spin, which enables a skilled golfer to have more control over the ball's flight and final position. Particularly, with approach shots into the green, the high spin rate of soft, wound balls enables the golfer to stop the ball very near its landing position.

Golf ball design and technology have now advanced to the point that the United States Golf Association (USGA), the organization that sets the rules of golf in the United States, has instituted a rule that prohibits the competitive use in any USGA sanctioned event of a golf ball that can achieve an initial velocity of 76.2 meters per second (m/s), or 250 ft/s plus an allowed tolerance of two percent when struck by a driver with a velocity of 39.6 m/s, i.e., 130 ft/s (referred to hereinafter as "the USGA test").

Manufacturers place a great deal of emphasis on producing golf balls that consistently achieve the highest possible velocity in the USGA test without exceeding the limit, which are available with a range of different properties and characteristics, such as spin, compression, "click," and "feel." Thus, a variety of different balls is available to meet the needs and desires of a wide range of golfers.

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approximate the USGA maximum of 77.7 m/s or 255 ft/s as closely as possible.

Therefore, golf ball manufacturers are continually searching for new ways in which to provide golf balls that deliver the maximum performance for golfers of all skill levels, and seek to discover compositions that provide the performance of a high compression ball with lower compression. At the same time, external factors such as production cost and environmental concerns play a role in the design of balls.

The physical characteristics of a golf ball are determined by the combined properties of the core, any mantle layers, and the cover. These, in turn, are determined by the chemical compositions of each. With regard to the core, a number of polymers, such as polybutadiene, natural rubber, styrene butadiene, and isoprene, are commonly used in fabricating golf ball cores. Today, golf ball cores are predominantly made of polybutadiene. Moreover, in order to obtain the desired physical properties for golf balls, manufacturers have added cross-linking agents, such as metallic salts of an unsaturated carboxylic acid. The amount of cross-linking agent added is typically about 20 to 50 parts per hundred parts of polybutadiene. Most commonly, zinc diacrylate or zinc dimethacrylate are used for this purpose. Of these two cross-linkers, zinc diacrylate has been found to produce golf balls with greater initial velocity than zinc dimethacrylate.

Typically, about 5 to 50 pph (parts per hundred) of zinc oxide (ZnO) is also added to the composition. This material serves as both a filler and an activation agent for the zinc diacrylate/peroxide cure system. The zinc diacrylate/peroxide cure system, which is well known to those of ordinary skill in this art, cross-links the polybutadiene during the core molding process. The high specific gravity of zinc oxide (5.57) can serve the dual purposes of adjusting the weight of the golf ball, in addition to acting as an activation agent.

Because zinc oxide is environmentally regulated, it would be advantageous to eliminate or at least substantially reduce the amount of this material from the manufacturing process. However, when the zinc oxide is eliminated from the composition described above, there is a reduction in cure enhancement, which results in less cross-linking and a corresponding reduction in compression and velocity. This result provides a ball with a softer feel, and allows less skilled golfers to compress the ball fully, but the resulting ball has less than the maximum velocity allowed by the USGA standard.

Therefore, it would be advantageous to provide a golf ball core composition with an activation agent other than zinc oxide, i.e., wherein all or at least some of the zinc oxide commonly present was eliminated, which would, as noted above, provide a ball with a lower compression while maintaining the velocity and distance of a high compression ball. The present invention provides such a golf ball core.

The performance of the golf ball—its spin and feel characteristics, for example—is not dictated solely by the chemical properties of the core. Those of the cover and mantle layers are also of fundamental importance. The cover, however, must also provide adequate durability. Consequently, design of a golf ball cover must take into account two factors: 1) its effect on the overall feel and play of the ball, and 2) its ability to withstand stress without cutting or cracking.

Balata was the standard cover stock material until the middle 1960's when E.I. DuPont de Nemours and Co. discovered a new species of resins known as ionomers or ionomer resins. These resins are sold under the trademark SURLYN® and, to a large extent, have replaced balata as a cover stock material. Balata is now primarily reserved for the high performance, wound balls.

Chemically, SURLYN® ionomer resins are a copolymer of an olefin and an alpha, beta ethylenically unsaturated carboxylic acid with 10–90% of the carboxylic acid groups being neutralized by a metal ion; see U.S. Pat. No. 3,264, 272. Today, the only commercially available ionomer resins are copolymers of ethylene and methacrylic or acrylic acid. Conventionally, these ionomer resins are distinguished by the type of metal ion, the amount of acid, the degree of neutralization, and the melt index. By varying these parameters, the resiliency, the flexural modulus and the hardness of the ionomer resins can be varied significantly. Thus, golf balls can be made having significantly different properties and performance using different ionomers or ionomer blends.

Dunlop Rubber Company obtained the first patent on the use of Surlyn for the cover of a golf ball, see U.S. Pat. No. 3,454,280 issued Jul. 8, 1969. Since then, there have been a number of disclosures on the use of these ionomer resins in the cover composition of a golf ball. See, for example, U.S. Pat. Nos. 3,819,768 issued Jun. 25, 1974; 4,323,247 issued Apr. 6, 1982; 4,526,375 issued Jul. 2, 1985; 4,884,814 issued Dec. 3, 1989; and 4,911,451 issued Mar. 27, 1990.

In November of 1986, DuPont introduced sodium and zinc ionomer resins having a low flexural modulus, below about 20,000 psi[1] (the so-called "low modulus" ionomers), and suggested using and blending the same with standard sodium ionomer resins for making a golf ball cover. Golf ball covers made with greater than 50% of the low modulus ionomers are relatively soft and form golf balls having high spin properties.

[1]Flexural modulus as published by Dupont.

In December of 1986, DuPont introduced a lithium ionomer resin which, together with standard sodium and zinc ionomers existing before November 1986, comprises a group of ionomers known as the "conventional" ionomers. The lithium ionomer as a copolymer of ethylene and methacrylic acid, optionally containing a softening acrylate comonomer. These lithium ionomer resins typically have a flexural modulus of about 60,000 to 70,000 psi (9,415 MPa to 10,980 MPa).[2] DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e. more durable) than a golf ball made from other known ionomer resins, e.g. sodium and zinc ionomer resins and blends thereof. DuPont further suggested that lithium ionomer resins could be used in blends with low modulus sodium ionomer resins where they can impart better cut resistance to these other materials.

[2]Flexural modulus as published by DuPont.

U.S. Pat. No. 5,000,459 discloses the use of lithium ionomers and sodium ionomers. More particularly, the reference discloses that balls made from at least 50% of lithium ionomer resin having 5 to 20 parts by weight of acrylic or methacrylic acid have excellent durability.

It has also been found that covers comprising about a 50/50 blend of a sodium ionomer having about 19% by weight methacrylic acid (a so-called "high acid" ionomer resin) and a lithium ionomer having about 15% by weight methacrylic acid are advantageous for distance or low spin type balls. These covers have a high resiliency, high flexural modulus and high hardness.

Despite these innovations, the golf ball covers they have provided still fail to interact with core and mantle layers to provide balls that combine the control and feel of a wound balata ball with the durability of a solid, two-piece ball. The present invention moves the art closer to that goal. It provides durable covers that interact with the cores disclosed herein to provide balls with desireable spin, compression, "click," and "feel."

DESCRIPTION OF THE PRIOR ART

Several patents have been issued which are directed towards modifying the properties of a conventional two piece ball by altering the typical single layer core and single cover layer construction to provide a multi-layer core. The inventions disclosed in the prior art patents are directed towards improving a variety of golf ball characteristics.

Several patents are directed towards improving the carry distance of the ball. For example, U.S. Pat. No. 4,863,167 relates to a three piece solid golf ball having improved rebound characteristics in order to increase its flight distance. This golf ball has a center portion and the outer layer formed from a rubber composition, preferably having a base rubber of polybutadiene, wherein the outer layer further contains a gravity filler such as tungsten or tungsten carbide so as to impart a higher specific gravity to the outer layer than that of the inner layer. The difference in specific gravity of the layers should be 0.15–0.8 for small balls and 0.15–0.45 for large balls. Preferably, the outer layer is harder than the center portion.

U.S. Pat. No. 5,184,828 relates to a solid three-piece golf ball having improved rebound characteristics and carry distance while maintaining an adequate spin rate. These characteristics are obtained by controlling the size of the inner core and outer layer as well as the specific gravity and hardness. The core and mantle layers are made from a rubber compound such as polybutadiene, and have a Shore D hardness of 30–62 and 30–56 respectively. The key to obtaining the desired rebound characteristics is that the maximum hardness (42–62) must be located at the interface between the core and the mantle and the hardness must then decrease both inwardly and outwardly.

U.S. Pat. No. 4,714,253 is also directed towards a three-piece golf ball having an excellent rebound coefficient. This golf ball has a core with a Shore C hardness of 57–80 in its center, but not more than 83 at a distance between 5–10 mm from its center and an outer layer with a Shore C hardness of 70–83.

Additionally, there are a number of patents also directed towards improving the spin, click and feel of solid balls while maintaining the distance provided by the solid construction. A variety of approaches to manipulating the core construction are described in the art. For example, U.S. Pat. No. 5,072,944 discloses a three-piece solid golf ball having a center and outer layer which are prepared from a rubber composition, preferably having a base rubber of polybutadiene. It is desirable that the center core is softer than the outer layer, each having a hardness (Shore C) of 25–50 and 70–90 respectively.

U.S. Pat. No. 4,625,964 relates to a solid golf ball having a polybutadiene rubber core of a diameter not more than 32 mm, and a polybutadiene rubber intermediate layer having a specific gravity of lower than that of the core material, and a cover.

U.S. Pat. No. 4,650,193 is directed towards a solid golf ball having a core comprising a central portion and an integral outer layer. Preferably the core is a curable elastomer such as polybutadiene which is treated with a cure altering agent to soften an outer layer of the core, thereby producing a central layer with a hardness (Shore C) of greater than 75 and an outer layer with a hardness (Shore A) of less than 80.

U.S. Pat. No. 4,848,770 discloses a non-wound three-piece golf ball which includes a core of a highly filled synthetic rubber or polymeric material, an intermediate mantle of an unfilled synthetic rubber and a cover. The core and intermediate mantle have a hardness of between 50–95.

U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

U.S. Pat. No. 5,253,871 concerns a golf ball having a three piece structure comprising an elastomer core, an intermediate layer of a thermoplastic material containing at least 10% of ether block copolymer, preferably blended with an ionomer and a thermoplastic cover.

Several patents are also directed to golf balls having multiple cover layers. For example U.S. Pat. No. 4,431,193 relates to a golf ball having a multi-layer cover wherein the inner layer is a hard, high flexural modulus ionomer resin and the outer layer is a soft, low flexural modulus ionomer resin, and wherein either or both layers may comprise a foamed ionomer resin.

U.S. Pat. No. 5,314,187 also relates to golf balls having a multiple layer cover, wherein the outer layer is molded over the inner layer and comprises a blend of balata and an elastomer and the inner layer is an ionomer resin.

U.S. Pat. No. 4,919,434 is directed towards a golf ball having a cover which comprises an inner layer and an outer layer each of which comprise a thermoplastic resin, preferably the layers comprise materials that are capable of fusion bonding with each other.

U.S. Pat. No. 5,609,532 is directed to a thread-wound golf ball including a wound core consisting of a center and a thread rubber layer thereon, and a cover having a plurality of dimples. The thread rubber layer has a thickness of 5 to 9 mm and a larger weight than the center. The cover is made of an ionomer resin having a thickness of 1 to 2.5 mm and a Shore D hardness of 52 to 68.

U.S. Pat. No. 5,556,095 is directed to a three-piece solid golf ball comprising a center core, an intermediate layer, and a cover. The center core is formed of a polybutadine base rubber and a specific gravity of less than 1.4, and a hardness up to 80 on JIS C scale. The intermediate layer is formed of a thermoplastic polyester elastomer and has a specific gravity of less than 1.2, and a hardness of less than 80 on JIS C scale. The cover has a hardness of at least 85 on JIS C scale.

U.S. Pat. No. 5,439,227 is directed to a multi-piece solid golf ball having a solid core including an inner layer circumscribed by an outer layer. The core inner layer is formed from a rubber composition. The core outer layer is formed by a polyether ester type thermoplastic elastomer having a Shore D hardness of 30–50. The core is surrounded by a cover of an ethylene-(meth)acrylate copolymer ionomer having a flexural modulus of 200–450 MPa and a Shore D hardness of 55–68.

U.S. Pat. No. 5,415,937 is directed to a golf ball cover comprised of 80 to 50% by weight of a high stiffness ionomer and 20 to 50% by weight of a low stiffness ionomer.

None of these patents recited above, however, disclose a multi-layer ball having the materials and material property requirements as disclosed herein to provide the improved golf balls of the present invention.

SUMMARY OF THE INVENTION

The present invention is directed towards a multi-layer golf ball which provides a softer feel similar to a conventional wound ball, while also providing the distance, durability and relative ease of manufacturing of a conventional two piece ball. Generally, the prior art has been directed at making golf balls perform like a three-piece ball by providing a softer cover. The present invention is directed to a golf ball that has a soft feel, and yet has the durability, low spin rate, and substantial distance characteristic of conventional two-piece balls. This is accomplished by using a soft, high specific gravity mantle layer, a soft core, and a high flexural modulus cover.

The present invention is further directed towards a multi-layer golf ball which comprises a core with one or more layers; at least one cover layer; and one or more mantle layers disposed between the core and cover layer. The core is preferably comprised of a polybutadiene rubber having an activation agent of calcium oxide. The mantle layer preferably comprises thermoplastic copolyetherester block copolymer, thermoplastic copolyesterester block copolymer, thermoplastic polyurethane, thermoset polyurethane, dynamically vulcanized thermoplastic elastomer, styrene-butadiene, styrene-isoprene and styrene-isoprene elastomers with a functional group such as maleic anhydride or sulfonic acid, polymer made using a metallocene catalyst, or blends thereof and/or thermoset materials and includes a filler to increase the specific gravity. The cover preferably comprises a blend of: (1) greater than about 40 parts by weight, based on 100 parts by weight resin, of a high acid ionomer; (2) greater than about 40 parts by weight of a conventional ionomer resin; and (3) about 2 to about 15 parts by weight of a low flexural modulus ionomer resin to provide distance and improved durability.

The present invention is still further directed to a multi-layer golf ball which comprises a core, at least one cover layer and at least one mantle layer disposed between the core and cover layer wherein properties such as the thickness, specific gravity, hardness, flexural modulus, tensile modulus, compression or Bashore resilience of the various layers is such as to provide a ball with distance performance characteristics such as low spin and high initial velocity, good durability and a soft feel.

The present invention is also directed to an improved multi-layer golf ball having a softer core. The composition of the golf ball core comprises a base mixture of polybutadiene, a metal salt diacrylate or dimethacrylate, preferably, zinc diacrylate in an amount of about 20 to 50 parts per hundred parts of polybutadiene, and a free radical initiator, to which calcium oxide (CaO) is added instead of zinc oxide as an activation agent in an amount sufficient to produce a golf ball core with the advantageous properties discussed below.

It has been found that when calcium oxide is used in a golf ball core composition as an activating agent, a lower compression golf ball core is obtained, which, when incorporated into a finished golf ball, provides a ball with an initial velocity in the USGA test that is comparable in velocity and distance to a standard, high compression ball that incorporates a core using zinc oxide. The calcium oxide can be added in an amount that reduces the compression of the golf ball, while maintaining the initial velocity of the ball in the USGA test. Alternatively, calcium oxide can be used in conjunction with an increased amount of zinc diacrylate to maintain a consistent compression and increased initial velocity. Typically, the amount of calcium oxide incorporated into the core composition of the invention is between about 0.1 and 15 parts per 100 parts of polybutadiene. The amount of calcium oxide used is preferably less than about 15 pph because when more than 15 pph is used there appears to be a large decrease in the golf ball core compression that results in a significant reduction in the initial velocity of balls incorporating such cores.

Still further, the present invention is directed to a golf ball comprising a core having a diameter of about 1.45 to 1.6 inches and a compression of less than about 90 PGA and a cover comprised of an ionomer blend of greater than or about 40% by weight of a first material, greater than or about 40% by weight of a second material and about or less than 10% by weight of a third material, wherein the first material has a flexural modulus of greater than about 70,000 psi, the second material has a flexural modulus of greater than or about 60,000 psi and the third material has a flexural modulus of less than about 20,000 psi.

Preferably, the cover layer consists essentially of three ionomer resins. The ionomer resins are preferably copolymers comprised of an olefin and an alpha, beta-unsaturated carboxylic acid or an E/X/Y terpolymer wherein E is an olefin, X is an n- or iso-alkyl acrylate or methacrylate and is present in an amount of 0 to about 50 weight percent and Y is an alpha, beta-unsaturated carboxylic acid. Preferably, the alpha, beta-unsaturated carboxylic acid is present in an amount of 16 to about 35% by weight in a first copolymer, in an amount of 13 to about 15% by weight in a second copolymer and in an amount of 10 to about 12% by weight in the third terpolymer. Still further, about 10 to about 90% of carboxyl groups of the copolymers are neutralized with a metal ion. Preferably, the first material is an ionomer made with greater than 16% methacrylic acid. More preferably, the first material is a sodium ionomer made with about 19% methacrylic acid. Preferably, the second material is an ionomer made with less than 16% methacrylic acid. More preferably, the second material is a lithium ionomer made with about 13 to 15% methacrylic acid. Preferably, the third material is an ionomer made with less than 13% methacrylic acid and having a low modulus, that is, a flexural modulus of less than 20,000 psi. Preferably, the third material is an ionomer made with about 10 to 12% methacrylic acid. The low modulus ionomer is preferably comprised of a sodium ionomer, a zinc ionomer, or mixtures thereof. More preferably, the low modulus ionomer is a terpolymer of ethylene, methacrylic acid and n-alkyl acrylate neutralized with a sodium ion.

Still further, fillers have been removed from the core of the preferred golf ball and added to the mantle layer and/or the cover. By moving weight from the core to the mantle layer and/or the cover, the spin rate of the ball is decreased. Moreover, it has been found that the compression of the ball is decreased by removing the fillers from the core and adding them to the mantle layer and cover. This improves the feel of the golf ball.

The invention thus provides a novel golf ball composition that offers the environmental benefit of eliminating or at least reducing the use of zinc oxide, while providing a golf ball with enhanced performance properties.

DETAILED DESCRIPTION OF THE PREFERRED EMBODIMENTS

The following terms that are used in this application are defined in terms of the enumerated ASTM tests:

Specific gravity ASTM D-297[3]

Flexural (Flex) Modulus ASTM D-790[4]

Shore D Hardness ASTM D-2240

Tensile Modulus ASTM D-638[5]

Bashore resiliency ASTM D-2632[6]

[3]Tests were carried out in lab conditions where temperature was controlled to 20–23° C. Humidity was not controlled.
[4]Tests were carried out using a 0.2 in/min cross-head speed and a 2 inch span length in the three point bending mode. Test samples were annealed at 140° F. for 24 hours and the tests were performed no earlier than 24 hours after annealing.
[5]Tests were carried out on type IV specimens using a 2 in/min cross-head speed without an extensiometer. Test samples were annealed at 140° F. for 24 hours and the tests were performed no earlier than 24 hours after annealing.
[6]Four (4) ⅛ inch samples were plied together to achieve the ½ inch test thickness.

For purposes of the present invention, the term "reaction conditions" can refer to any reaction condition that can affect the ability of the inventive core compositions to form free radicals. Reaction conditions include, for example, temperature, time and pressure.

As used herein, the terms "points" or "compression points" refer to the compression or the compression scale based on the ATTI Engineering Compression Tester. This scale, which is well known to those working in this field, is used in determining the relative compression of a core or ball and has been referred to as the PGA compression. Some artisans use the Reihle compression scale instead of the standard compression scale. Based on disclosure in U.S. Pat. No. 5,368,304, column 20, lines 55–53 it appears that Reihle compression values can be converted to compression values through the use of the following equation:

compression value=160−Reihle compression value.

Figure 1:
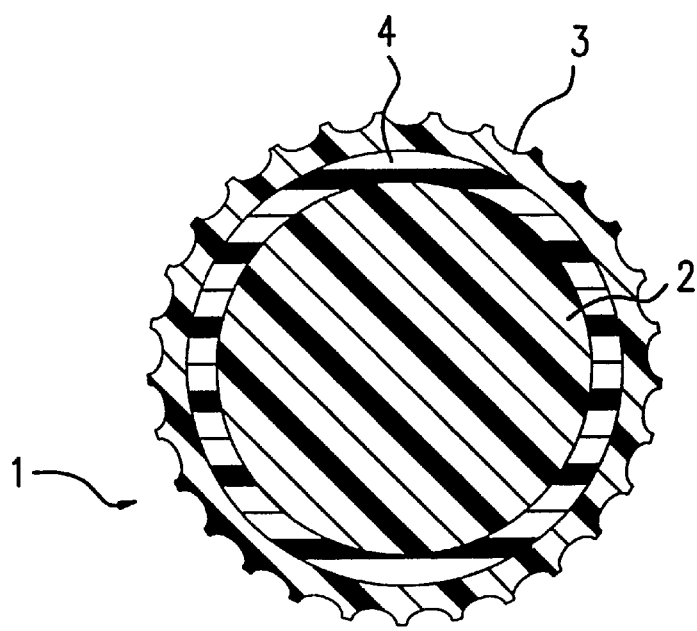
FIG. 1 is a cross-sectional view of a golf ball according to the present invention.
Figure 2:
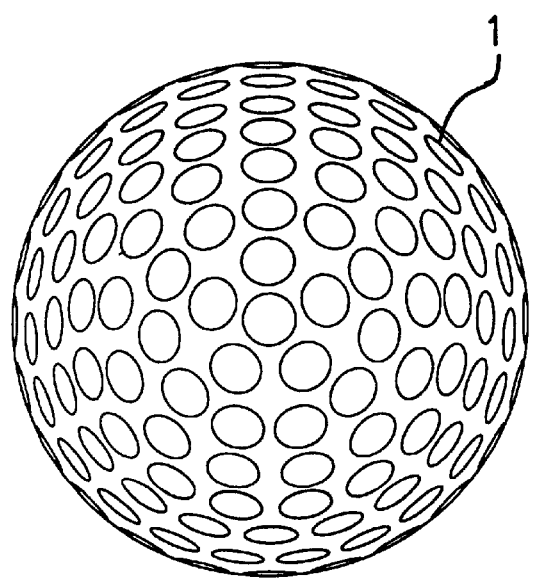
FIG. 2 is a perspective view of a golf ball according to the present invention.

Referring to FIGS. 1 and 2, this invention is particularly directed towards a multi-layer golf ball 1 which comprises a core 2, at least one cover layer 3 and at least one mantle layer 4 disposed therebetween.

A representative base composition for forming the golf ball core 2, prepared in accordance with the present invention, comprises polybutadiene and, in parts by weight based on 100 parts polybutadiene, 20–50 parts of a metal salt diacrylate, dimethacrylate, or monomethacrylate, preferably zinc diacrylate. The polybutadiene preferably has a cis-1,4 content of above about 90% and more preferably above about 96%. Commercial sources of polybutadiene include Shell 1220 manufactured by Shell Chemical, Neocis BR40 manufactured by Enichem Elastomers, and Ubepol BR150 manufactured by Ube Industries, Ltd. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are usually based on 100 parts by weight of the total elastomer mixture.

Metal salt diacrylates, dimethacrylates, and monomethacrylates suitable for use in this invention include those wherein the metal is magnesium, calcium, zinc, aluminum, sodium, lithium or nickel. Zinc diacrylate is preferred, because it provides golf balls with a high initial velocity in the USGA test. The zinc diacrylate can be of various grades of purity. For the purposes of this invention, the lower the quantity of zinc stearate present in the zinc diacrylate the higher the zinc diacrylate purity. Zinc diacrylate containing less than about 10% zinc stearate is preferable. More preferable is zinc diacrylate containing about 4–8% zinc stearate. Suitable, commercially available zinc diacrylates include those from Rockland React-Rite and Sartomer. The preferred concentrations of zinc diacrylate that can be used are 20–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to, peroxide compounds, such as dicumyl peroxide, 1,1-di (t-butylperoxy) 3,3,5-trimethyl cyclohexane, a-a bis (t-butylperoxy) diisopropylbenzene, 2,5-dimethyl-2,5 di (t-butylperoxy) hexane, or di-t-butyl peroxide, and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph.

A typical prior art golf ball core incorporates 5 to 50 pph of zinc oxide in a zinc diacrylate-peroxide cure system that cross-links polybutadiene during the core molding process.

In the present invention, the zinc oxide (ZnO) is eliminated in favor of calcium oxide (CaO) in the golf ball core composition. The cores and balls produced from such an admixture typically exhibit enhanced performance properties. The initial velocity of the standard ball is maintained at or near the maximum allowed by the USGA, but the compression of the ball is reduced by at least about 2 compression points on the standard compression scale, and may be reduced as much as 14 points. On the other hand, by using calcium oxide and a higher percentage of zinc diacrylate, a ball can be made having the same compression as one made with the zinc oxide, but with a significantly increased initial velocity. Where the amount of zinc oxide incorporated in prior art cores is, as noted above, typically about 5 to 50 pph, the amount of calcium oxide added as an activator to the core-forming composition of the invention is typically in the range of about 0.1 to 15, preferably 1 to 10, most preferably 1.25 to 5, parts calcium oxide per hundred parts (pph) of polybutadiene.

The compositions of the present invention may also include fillers, added to the elastomeric composition to adjust the density and/or specific gravity of the core. As used herein, the term "fillers" includes any compound or composition that can be used to vary the density and other properties of the subject golf ball core. Fillers useful in the golf ball core according to the present invention include, for example, zinc oxide (in an amount significantly less than that which would be necessary without the addition of the calcium oxide), barium sulfate, and regrind (which is recycled core molding matrix ground to 30 mesh particle size). The amount and type of filler utilized is governed by the amount and weight of other ingredients in the composition, since a maximum golf ball weight of 1.620 ounces (45.92 gm) has been established by the USGA. Appropriate fillers generally used range in specific gravity from about 2.0 to 5.6. In the preferred golf ball, the amount of filler is lower than that of a typical golf ball such that the specific gravity of the core is decreased. As will be discussed in more detail below, the filler removed from the core is added to the mantle layer and/or the cover of the preferred golf ball.

The golf ball core 2, as shown in FIG. 1, in typical prior art golf balls has a specific gravity of about 1.2 to 1.5. The preferred range of specific gravities of the present invention is from about 1.0 to about 1.2, more preferably in the range of about 1.1 to about 1.18, depending upon the size of the core, cover, mantle layer and finished ball, as well as the specific gravity of the cover and mantle layer.

Antioxidants may also be included in the elastomer cores produced according to the present invention. Antioxidants are compounds which prevent the breakdown of the elastomer. Antioxidants useful in the present invention include, but are not limited to, quinoline type antioxidants, amine type antioxidants, and phenolic type antioxidants.

Other ingredients such as accelerators, e.g. tetra methylthiuram, processing aids, processing oils, plasticizers, dyes and pigments, as well as other additives well known to the skilled artisan may also be used in the present invention in amounts sufficient to achieve the purpose for which they are typically used.

The core compositions of the invention are produced by forming a mixture comprising at least polybutadiene, zinc diacrylate, and calcium oxide. Either the calcium oxide is used to reduce the compression by at least about 2 points on the compression scale, compared to a core composition having zinc oxide or the amount of zinc diacrylate is increased such that the compression is the same, but the initial velocity is increased. In other words, by using calcium oxide, either the ball compression can be lowered and the initial velocity maintained or the amount of zinc diacrylate can be increased so that the ball compression is the same and the initial velocity is increased. The Examples below set forth these principals and show the advantage of using calcium oxide.

When a set of predetermined conditions is met, i.e., time and temperature of mixing, the free radical initiator is added in an amount dependent upon the amounts and relative ratios of the starting components, as would be well understood by one of ordinary skill in the art. In particular, as the components are mixed, the resultant shear causes the temperature of the mixture to rise. Peroxide(s) free radical initiator(s) are blended into the mixture for crosslinking purposes in the molding process.

After completion of the mixing, the golf ball core composition is milled and hand prepped or extruded into pieces ("preps") suitable for molding. The preps are then compression molded into cores at an elevated temperature. Typically, 160° C. (320° F.) for 15 minutes is suitable for this purpose. These cores can then be used to make finished golf balls by surrounding the cores with mantle and cover materials.

EXAMPLES

These and other aspects of the present invention may be more fully understood with reference to the following nonlimiting examples, which are merely illustrative of the preferred embodiment of the present invention golf ball, and are not to be construed as limiting the invention, the scope of which is defined by the appended claims. The results obtained with the balls according to the examples are, however, representative of the improved performance characteristics yielded by the present invention.

The discussion below first discusses the core, the cover and then the mantle layer, of the golf balls of the present invention.

Table I sets forth the contents of the golf ball cores that were made to illustrate the effect of using calcium oxide instead of zinc oxide. The control core and Examples 1–3 all contain zinc oxide. Example 4 was made without zinc oxide or calcium oxide and Examples 5–9 were made with different amounts of calcium oxide. The compositions used to prepare the golf ball cores of these examples are all in parts per hundred (pph), based on 100 parts of polybutadiene. The fillers used in the compositions of these examples are regrind and barium sulfate ($BaSO_4$). Vulcup 40KE® and Varox 231XL® are free radical initiators, and are a-a bis (t-butylperoxy) diisopropylbenzene and 1,1-di (t-butylperoxy) 3,3,5-trimethyl cyclohexane, respectively. Yel MB is a yellow pigment in a styrene butadiene binder, which is used to color the composition for identification purposes. The zinc diacrylate contained no more than about 4–8% zinc stearate.

All the ingredients except the peroxides were mixed in a Process Lab Brabender mixer to 82.2–93.3° C. (180–200° F.). The peroxides were added in the second stage to the initial mixture, and the resulting mixture was removed from the Brabender and blended on a lab mill to insure homogeneity. After mixing, the admixture was then hand rolled using a laboratory mill and cut into pieces or "preps". These preps were then compression molded at 160° C. (320° F.) for 15 minutes to form the cores. To fabricate the finished golf balls, the cores were inserted into two cover hemispheres of a lithium-sodium blend of SURLYN®, which were molded to encase the core.

The cores and balls prepared according to the above-described method were tested for their compression and initial velocity. The compression ratings were obtained using a commercial compression tester. The initial velocity results were obtained from a standard technique, whereby the cores or balls are struck at 39.6 m/s (130 ft/s), and pass through light gates, which measure their speed. Both of these standard measurement techniques are well-known to those of ordinary skill in the art of making golf ball cores and balls.

As shown below in Table II, reduction in the zinc oxide concentrations in Examples 1–3 results in a slight decrease in ball compression and a slight drop in initial velocity compared to the control ball. Similar results are obtained with the core. The complete removal of zinc oxide in Example 4 reduces the compression of both the core and the ball by a significant amount, greater than 10 points, but also reduces the initial velocity of the core and ball significantly, approximately one mile per hour. When the zinc oxide is eliminated from the core composition, and calcium oxide is added in Examples 5–8, both the cores and finished balls containing calcium oxide have a lower compression, but the initial velocity of the low compression balls and cores is comparable to that of the high compression control ball.

TABLE I

| Example No. | Control | 1 | 2 | 3 | 4 | 5 | 6 | 7 | 8 | 9 |
| --- | --- | --- | --- | --- | --- | --- | --- | --- | --- | --- |
| Polybutadiene | 100 | 100 | 100 | 100 | 100 | 100 | 100 | 100 | 100 | 100 |
| Regrind | 16.3 | 16.3 | 16.3 | 16.3 | 16.3 | 16.3 | 16.3 | 16.3 | 16.3 | 16.3 |
| Vulcup 40KE ® | 0.23 | 0.23 | 0.23 | 0.23 | 0.23 | 0.23 | 0.23 | 0.23 | 0.23 | 0.23 |
| Varox 231XL ® | 0.43 | 0.43 | 0.43 | 0.43 | 0.43 | 0.43 | 0.43 | 0.43 | 0.43 | 0.43 |
| $BaSO_4$ | 20.5 | 22.0 | 23.1 | 24.2 | 25.8 | 21.5 | 22.5 | 23.5 | 24.7 | 12.0 |
| Yel.MB | 0.10 | 0.10 | 0.10 | 0.10 | 0.10 | 0.10 | 0.10 | 0.10 | 0.10 | 0.10 |
| Zinc Diacrylate | 26.9 | 26.9 | 26.9 | 26.9 | 26.9 | 26.9 | 26.9 | 26.9 | 26.9 | 26.9 |
| Zinc Oxide | 5.0 | 3.75 | 2.50 | 1.25 | — | — | — | — | — | — |
| Calcium Oxide | — | — | — | — | — | 5.0 | 3.75 | 2.50 | 1.25 | 15.0 |

TABLE II

| Example No. | Control | 1 | 2 | 3 | 4 | 5 | 6 | 7 | 8 | 9 |
| --- | --- | --- | --- | --- | --- | --- | --- | --- | --- | --- |
| Zinc Oxide (pph) | 5.0 | 3.75 | 2.50 | 1.25 | — | — | — | — | — | — |
| Calcium Oxide (pph) | — | — | — | — | — | 5.0 | 3.75 | 2.50 | 1.25 | 15.0 |
| Core Initial Velocity (ft/s) | 250.63 | 250.74 | 250.55 | 250.52 | 249.38 | 250.56 | 250.30 | 250.21 | 250.24 | 248.56 |
| Ball Initial Velocity (ft/s) | 252.62 | 252.83 | 252.62 | 252.43 | 251.71 | 252.91 | 252.80 | 252.81 | 252.55 | 250.92 |

TABLE II-continued

| Example No. | Control | 1 | 2 | 3 | 4 | 5 | 6 | 7 | 8 | 9 |
|---|---|---|---|---|---|---|---|---|---|---|
| Core Compression | 81 | 82 | 79 | 78 | 70 | 70 | 69 | 69 | 71 | 44 |
| Ball Compression | 97 | 100 | 98 | 97 | 90 | 88 | 88 | 86 | 88 | 63 |

Table III illustrates the effect of varying amounts of calcium oxide, zinc oxide and zinc diacrylate in golf ball cores on compression ratings and initial velocity. Examples A–D below are multi-layer balls having a Hytrel® 3078 mantle layer and SURLYN® covers made of 50% high acid SURLYN® and 50% standard SURLYN®. Each of the balls has a 1.39 inch diameter polybutadiene core made with the compositions listed. The results show that the compression can be decreased for a ball made with zinc oxide by decreasing the percentage of zinc diacrylate as shown by the comparison of Examples A and B. However, by decreasing the zinc diacrylate, the ball initial velocity was decreased. When comparing Examples B and C, the effect of substituting calcium oxide for zinc oxide is shown. Here the ball having calcium oxide, Example C, has a lower compression and higher initial velocity than the ball with zinc oxide, Example B. Moreover, Examples D and B show that by using calcium oxide with an increased amount of zinc diacrylate the compression can be decreased and the initial velocity substantially increased. As shown by Table III, both balls having calcium oxide, Examples C and D, exhibit a very low compression, below 80, and high initial velocity.

TABLE III

|  | A | B | C | D |
|---|---|---|---|---|
| Polybutadiene | 62.7 | 62.7 | 62.7 | 62.7 |
| Regrind | 17.07 | 17.07 | 17.07 | 17.07 |
| Vulcup 40KE ® | 0.23 | 0.23 | 0.23 | 0.23 |
| Varox 231XL ® | 0.42 | 0.42 | 0.42 | 0.42 |
| Cimbar 325 | 31.70 | 32.5 | 32.93 | 32.56 |
| Zinc diacrylate | 23.47 | 21.33 | 21.33 | 22.33 |
| Zinc Oxide | 2.13 | 2.13 | — | — |
| Calcium Oxide | — | — | 2.13 | 2.13 |
| Ball Initial Velocity (ft/s) | 251.06 | 250.86 | 251.26 | 252.08 |
| Core Compression | 67 | 53 | 36 | 47 |
| Ball Compression | 92 | 85 | 76 | 79 |

As depicted in FIG. 1, a cover 3 encompases the core and mantle layers of the present invention. It has an outer diameter of about 1.68 to about 1.72 inches, and is preferably comprised of a blend of greater than or about 40% by weight of a first cover material, greater than or about 40% by weight of a second cover material and about or less than 15% by weight of a third cover material, wherein the first cover material has a flexural modulus of greater than about 70,000 psi, the second cover material has a flexural modulus of greater than or about 60,000 psi and the third cover material has a flexural modulus of less than about 10,000 psi.

Preferably, the first cover material has a flexural modulus which is above about 70,000 psi (485 MPa).[7] More preferably, the flexural modulus of the first cover material is above about 75,000 psi (515 MPa)[8]. Preferably, the first cover material is an ionomer resin comprised of a copolymer comprising about 85 to 70 parts by weight of an olefin such as ethylene and greater than 16 wt. % of an alpha, beta-unsaturated carboxylic acid such as methacrylic acid wherein about 10% to about 90% of the carboxylic acid groups are neutralized by a metal ion. More preferably, the first cover material is an ionomer made with about 17–20 wt. % of an alpha, beta-unsaturated carboxylic acid such as methacrylic acid wherein about 35% to about 65% of the carboxylic acid groups are neutralized by sodium.

[7]Flexural modulus as published by DuPont.
[8]Flexural modulus as published by DuPont.

A presently preferred first cover material is SURLYN® 8140, which is an ionomer comprised of about 18 to 20 wt. % methacrylic acid and neutralized with sodium. This material has a flexural modulus of over 75 kpsi (515 MPa). Another preferred first cover material is SURLYN® AD 8546 (SEP671), which is an ionomer comprised of about 18 to 20 wt. % methacrylic acid and neutralized with lithium. This material also has a flexural modulus of over about 75 kpsi (515 MPa).

The second cover material is preferably an ionomer at least partially neutralized with lithium, zinc, sodium or mixtures thereof. More preferably, the second cover material is a lithium ionomer resin, consisting of a copolymer comprising about 95 to about 80 parts by weight of ethylene and about 13 to about 16 parts by weight of an alpha, beta-unsaturated carboxylic acid such as acrylic or methacrylic acid based on 100 parts by weight copolymer wherein about 10% to about 90% of the carboxylic acid groups are neutralized by lithium. Most preferably, about 35% to about 65% of the carboxylic acid groups are neutralized by lithium.

Preferably, the second cover material has a flexural modulus which is above about 60,000 psi (415 MPa).[9] More preferably, a lithium ionomer resin used as the second cover material in the present invention has a flexural modulus from about 60,000 psi to about 80,000 psi (415 to 550 MPa).[10] Good results have been obtained with the lithium ionomer resins having flexural moduli in the range from about 60,000 psi to about 70,000 psi (415 to 485 MPa).[11] Good results have been obtained using any of the lithium ionomer resins sold by DuPont under the trade names SURLYN 8118, 7930 and 7940 as the second cover material. SURLYN 8118, 7930 and 7940 have flexural modulus of 61,000 psi (420 MPa), 67,000 psi (460 MPa) and 61,000 psi (420 MPa) respectively.[12] The flexural modulus is reportedly measured in accordance with ASTM Method D-790.

[9]Flexural modulus as published by DuPont.
[10]Flexural modulus as published by DuPont.
[11]Flexural modulus as published by DuPont.
[12]Flexural modulus as published by DuPont.

Preferably, the third cover material is a low modulus ionomer that has a flexural modulus of less than 10,000 psi and, more preferably, from about 2,000 psi to about 10,000 psi (14 to 70 MPa).[13]The low modulus ionomer preferably comprises sodium, zinc or mixtures thereof. More preferably, the third cover material is a sodium ionomer resin, consisting of a terpolymer comprising about 38 to about 90 parts by weight of an olefin such as ethylene and about 9 to about 12 parts by weight of an alpha, beta-unsaturated carboxylic acid such as acrylic or methacrylic acid based on 100 parts by weight and 1 to 50 parts by weight of n- or iso-alkyl acrylate or methacrylate, wherein about 10% to about 90% of the carboxylic acid groups are neutralized by sodium. Most preferably, about 35% to about 65% of the carboxylic acid groups are neutralized by sodium and an n- or iso-butyl acrylate is used.

[13]Flexural modulus as published by DuPont.

Sodium ionomer resins sold by DuPont under the name SURLYN 8320, SURLYN 8269 and SURLYN 8265 work well as the third cover material in the present invention. SURLYN 8320, SURLYN 8269 and SURLYN 8265 have flexural modulus of 2,800 psi (20 MPa), 2,800 psi (20 MPa) and 7,100 psi (50 MPa), respectively.[14]

[14]Flexural modulus as published by DuPont.

Preferably, the ionomer resins have the same monocarboxylic acid, e.g. either methacrylic or acrylic acid.

Preferably, the flexural modulus of the blended cover material is greater than 70 kpsi, more preferably, from about 75 kpsi to about 100 kpsi (as determined according to ASTM Method D-790). Most preferably, the cover material has a flexural modulus of about 85 kpsi. Furthermore, the preferred cover has a hardness of at least about 70 Shore D as determined by ASTM method D-2240 by placing the probe on the flat surface of the golf ball comprising the cover. The high flexural modulus of the cover provides increased initial velocity for extra distance.

Blends of about 45/45/10 parts by weight of first/second/third cover materials, respectively, for the outermost cover are preferred because they provide high initial velocity to a golf ball struck by a golf club without undue golf ball hardness. Furthermore, as shown in Table IV, the addition of the third cover material tends to yield balls that are more durable than those made from just the first and second cover materials alone.

Golf balls having a solid core and a compression molded cover were tested for rupture resistance by using a hitting machine to hit a golf ball into a catching net, then automatically returning the ball into position where it is hit again. The test continued until the pre-set number of hits was reached, 350 hits being the maximum number of hits used herein, or until the golf ball ruptured, as judged by visual observations. A minimum sample size of 12 golf balls was used, each subjected to the pre-set number of hits. Ruptured balls were visually observed to determine the location of the failure. The results obtained are summarized in Table IV.

From these tests, it was determined that the number of hits which a golf ball can sustain is increased when the cover comprises the three ionomer blend of the invention. For instance, the first cover fails after only 200 hits for Example 12, with a cover comprising only two primary ionomer components, while for Example 13, where the cover comprises the three ionomer blend of the present invention, there is no golf ball cover failure until 250 hits, an increase in 500 hits without any failure.

In addition, the type of failure experienced is changed significantly by using a golf ball cover comprising the three ionomer blend of the present invention. Only random failures are observed for golf ball covers that are prepared from the three ionomer cover blends of the present invention and which fail the durability test: Example 13. In contrast, golf balls prepared with the two ionomer blend covers of the prior art, Example 12, exhibited a failure at the buffing line or parting line, where the half-shells are joined. This indicates that the bond between half-shells during the compression molding stages was substantially increased for covers prepared from half-shells comprising the blend of the present invention.

Another way to adjust the characteristics of the cover stock is to use ionomer resins at least partially neutralized with metal ions other than sodium and lithium. While certain metal ions are described as preferred in the present invention, it would not be a departure from the scope and spirit of the invention to adjust the characteristics of the cover stock by using other metal ions to partially neutralize the subject ionomer blends.

The combined amount of ionomer resins used to make a cover in accordance with the present invention as herein described generally makes up at least about 90% by weight of the total weight of the golf ball cover and, preferably, at least about 95% by weight. Additional materials which may be included in the golf ball cover include but are not limited to: other ionomer resins; whitening agents such as titanium dioxide; dyes; UV absorbers; optical brighteners; processing aids; and other additives which are conventionally included in golf ball covers.

Preferably, the cover stock used to make a golf ball cover in accordance with the present invention is a blend of the ionomer resins in the amounts specified hereinabove. Blending of the ionomer resins is accomplished in a conventional manner using conventional equipment by methods familiar to those in the polymer blending art. For example, blending is performed by combining the components with a two roll mill, a Banbury mixer or a single or twin-screw extruder, to produce the cover blends of the present invention. The single screw extruder may optionally have a grooved barrel wall,

TABLE IV

| | Composition, wt. % | | | | Durability[a], at Number of Hits | | | |
|---|---|---|---|---|---|---|---|---|
| Example Number | SURLYN ® 8140[b] | SURLYN ® 7940[c] | SURLYN ® 8320[d] | Color Concentrate | 200 | 250 | 300 | 350 |
| 13 | 42.5 | 42.5 | 10.0 | 5 | 0 | 2R | 4R | — |
| 12 | 47.5 | 47.5 | 0 | 5 | 1R | 3R | 1R, 1BL | — |

1. 40 wt. % TiO$_2$/60 wt. % ionomer
[a]Number of failures and mode of failure: R = random failure, BL = failure at buffing line (No failure for all Examples below 200 hits)
[b]about 9 to 11% acid ionomer partially neutralized with sodium
[c]about 14 to 16% acid ionomer partially neutralized with lithium
[d]about 18 to 20% acid very low modulus ionomer partially neutralized with sodium comprise a barrier screw or be of a shortened screw design. The twin screw extruder may be of the counter-rotating non-intermeshing, co-rotating non-intermeshing, counter-rotating fully intermeshing or co-rotating fully intermeshing type.

Good results have been obtained by mixing the ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding over the core or to directly mold the cover about the core in a retractable-pin mold. Such machines are conventional.

Conventional equipment used in the production of golf balls may be used to form the golf balls of the invention. For example, golf balls and golf ball covers comprising the outermost cover compositions of the invention can be made in a conventional manner by molding cover stock about a core. Molding is accomplished either by injection molding cover stock about a core or by compression molding preformed half-shells about a core. The preferred method is compression molding. Half-shells are made by injection molding a cover stock into a conventional half-shell mold in a conventional manner.

The preformed half-shells are then placed about a core and the assembly is introduced into a compression molding machine. Conventionally, the compression molding machine is a hydraulic press having upper and lower mold plates. As taught by U.S. Pat. No. 4,508,309, each such mold plate has half molds, which are registered with half molds in the opposite mold plate. For example, it has been found that a golf ball is formed with a cover in accordance with the present invention when the half-shells are compression molded about a core at about 300° F. (149° C.). The molded balls are then cooled while still in the mold and finally removed when the cover is hard enough to be handled without deforming.

After the balls have been molded, they undergo various conventional finishing operations such as buffing, painting and stamping.

Turning now to the mantle layer 4, it preferably comprises thermoplastic copolyesterester block copolymer, dynamically vulcanized thermoplastic elastomer, styrene-butadiene elastomer with functional groups such as maleic anhydride or sulfonic acid attached, thermoplastic polyurethane or polymers made using a metallocene catalyst or blends thereof.

In a preferred embodiment of the present invention, the mantle layer 4 is a thermoplastic copolyetherester block copolymer. Suitable thermoplastic copolyetheresters include Hytrel® 3078, Hytrel® G3548W and Hytrel® G4078W which are commercially available from DuPont. Hytrel® 3078 being the most preferred.

Prior art mantle layers generally have a specific gravity of about 1 or less. As stated above, the objective of most prior art multi-layer balls is to increase spin. The mantle layer according to the present invention preferably has a specific gravity greater than about 1.2. Most preferably, the specific gravity of the mantle layer is increased to about 1.25 by adding about 20% of a filler such as barium sulfate, zinc oxide, titanium dioxide and combinations thereof. The most preferred golf ball is comprised of a mantle layer made of Hytrel® 3078 and 20% zinc oxide. By increasing the specific gravity of the mantle layer and decreasing the specific gravity of the core, the moment of inertia is increased, which will contribute to a lower initial spin rate.

Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems. Examples of suitable functionalized styrene-butadiene elastomers, i.e., styrene-butadiene elastomers with functional groups such as maleic anhydride or sulfonic acid, include Kraton FG-1901x and FG-1921x, which are available from the Shell Corporation. Examples of suitable thermoplastic polyurethanes include Estane® 58133, Estane® 58134 and Estane® 58144, which are commercially available from the B.F. Goodrich Company. Suitable metallocene polymers, i.e., polymers made with a metallocene catalyst, whose melting points are higher than the cover materials can also be employed in the mantle layer of the present invention. Further, the materials for the mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass.

In another preferred embodiment of the present invention, the mantle layer is a blend of a first and a second thermoplastic, wherein the first thermoplastic is a thermoplastic copolyetherester or copolyesterester block copolymer, a dynamically vulcanized thermoplastic elastomer, a functionalized styrene-butadiene elastomer, a thermoplastic polyurethane or a metallocene polymer and the second thermoplastic is a material such as a thermoplastic polyurethane, a thermoplastic polyetherester or polyetheramide, a thermoplastic ionomer resin, a thermoplastic polyester, another dynamically vulcanized elastomer, another functionalized styrene-butadiene elastomer, another metallocene polymer or blends thereof.

Suitable thermoplastic polyetheresters include Hytrel® 3078, Hytrel® G3548W and Hytrel® G4078W which are commercially available from DuPont. Suitable thermoplastic polyetheramides include Pebax® 2533, Pebax® 1205 and Pebax® 4033 which are available from Elf-Atochem. Suitable thermoplastic ionomer resins include any number of olefinic based ionomers including SURLYN® 8320, 8269 and 8265, which are commercially available from DuPont. The flexural moduli for these ionomers is less than about 10 kpsi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

The properties such as compression, specific gravity, hardness, Bashore resilience, modulus, core diameter and mantle layer thickness of the golf balls of the present invention have been found to effect play characteristics such as spin, initial velocity and feel of the present golf balls.

In particular, the thickness of the mantle layer of the present invention is about 0.025 inches to about 0.125 inches. Preferably, the thickness of the mantle layer is about 0.04 inches to about 0.10 inches. Most preferably, the thickness of the mantle layer is about 0.06 inches. Similarly, the diameter of the core of the present invention is about 1.25 inches to about 1.51 inches. Preferably the diameter of the core is about 1.30 inches to about 1.48 inches. Most preferably, the diameter of the core is about 1.39 inches. The overall diameter of the core and mantle layer is about 84% to about 97% of the overall diameter of the finished ball, and is preferably about 1.51 inches. Preferably, the thickness of the cover is greater than or equal to 0.05 inch and more preferably is greater than 0.08 inch.

Preferably, the specific gravity of the core is less than about 1.2 and, more preferably, less than about 1.16. The mantle layer and/or the cover preferably have specific gravities greater than about 1.2 and, most preferably, about 1.25.

Table V provides test data to show the decrease in spin rate for golf balls according to the present invention. The golf balls in Examples 1 and 2 are comprised of cores made of polybutadiene with zinc oxide, mantle layers made of Hytrel® 3078 and covers made of a blend of SUR-LYN®7930 and 8920. However, the ball in Example 2 has a low weight core and heavy mantle and cover layers according to the present invention. In the ball of Example 2, 20% and 30% of barium sulfate was added to the mantle layer and cover, respectively. By removing some of the fillers from the core and adding fillers to the mantle and cover layers, the moment of inertia is increased and the spin rate of the ball is significantly decreased. Also, the compression of the core is decreased from the removal of the fillers, which contributes to the decreased initial spin rate. The driver spin rate of the Example 2 ball is almost 200 rpm less than the Example 1 ball and the 8 iron spin rate is almost 500 rpm less. Moreover, by removing the fillers from the core, the ball in Example 2 is much softer and has a better feel than the ball in Example 1. Preferably, the removal of the fillers from the core decreases the ball compression by at least 5 compression points and, most preferably, decreases the compression of the core so that the compression of the ball is about 80 or less.

TABLE V

|  | Example 1 | Example 2 |
| --- | --- | --- |
| Core Size (in) | 1.39 | 1.39 |
| Core Weight (oz) | 1.00 | 0.86 |
| Mantle Thickness (in) | 0.060 | 0.060 |
| Mantle Weight (oz) | 0.23 | 0.26 |
| Mantle Specific Gravity | 1.07 | 1.27 |
| Cover Thickness (in) | 0.085 | 0.085 |
| Cover Weight (oz) | 0.37 | 0.48 |
| Cover Specific Gravity | 0.96 | 1.25 |
| Ball Weight (oz) | 1.60 | 1.60 |
| Ball Compression | 86 | 74 |
| Spin Rate - Driver (rpm) | 3174 | 2982 |
| - 8 Iron (rpm) | 7860 | 7374 |

Moreover, it has been found that the initial velocity is increased by removing the filler from the core and adding it to the mantle and/or the cover. In the test shown in Table VI, filler was removed from the core in Example 3 and added to the mantle layer in Example 4. The mantle layer of Example 4 was comprised of Hytrel® 3078 and 20% zinc oxide. As can be seen from the test data below, the initial velocity of the ball in Example 4 is higher than the ball in Example 3, and the spin rates are less.

TABLE VI

|  | Example 3 | Example 4 |
| --- | --- | --- |
| Core Size (in) | 1.39 | 1.39 |
| Core Specific Gravity | 1.19 | 1.16 |
| Mantle Thickness (in) | 0.060 | 0.060 |
| Mantle Specific Gravity | 1.07 | 1.27 |

TABLE VI-continued

|  | Example 3 | Example 4 |
| --- | --- | --- |
| Cover Thickness (in) | 0.085 | 0.085 |
| Cover Specific Gravity | 0.96 | 0.96 |
| Ball weight (oz) | 1.59 | 1.60 |
| Ball Compression | 80 | 80 |
| Ball Initial Velocity | 251.5 | 251.7 |
| Spin Rate - Driver (rpm) | 3270 | 3238 |
| - 8 Iron (rpm) | 7517 | 7416 |

The present multi-layer golf ball can have an overall diameter of any size. Although the United States Golf Association (USGA) specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The flexural and/or tensile moduli of the mantle layer are believed to have an effect on the "feel" of the golf balls of the present invention. Accordingly, it is preferable that the golf balls of the present invention have a mantle layer with a flexural modulus of about 500 psi to about 50,000 psi in order to impart a softer "feel" to the golf balls of the present invention. Likewise, it is preferred that the mantle layer have a tensile modulus of about 500 psi to about 50,000 psi in order to impart a softer "feel" to the golf balls of the present invention. More preferably, the flexural modulus and tensile modulus of the mantle layer are both less than about 10,000 psi. Most preferably, the flexural modulus of the mantle layer is less than 5000 psi.

Further, the core of the present invention has a Bashore resilience of about 30 to about 80. Preferably the core has a Bashore resilience of about 40 to about 70. The mantle layer of the present invention has a Bashore resilience of about 35 to about 75. Preferably the mantle layer has a Bashore resilience of about 60–70.

The golf balls of the present invention have a mantle layer with a Shore D hardness of less than about 60. Preferably, the Shore D hardness of the mantle layer is about 20 to about 60. Most preferably, the mantle layer has a Shore D hardness of about 30 to provide the soft "feel" desired. The core has a Shore D hardness of about 30 to about 65. Preferably, the core has a Shore D hardness of about 35 to about 60 and a compression less than 60 such that the ball compression is less than about 90. Most preferably, the core compression is low enough to make the ball compression less than or equal to about 80.

The golf balls of the present invention can be made by any conventional process employed in the golf ball art. For example, the solid cores can be either injection or compression molded. Similarly, the undersized wound cores of the present invention are produced through conventional means. The mantle layer is subsequently injection or compression molded about the core. It is important that the mantle material be able to sustain the temperatures applied during the application of the cover layer. The cover layer or layers are then injection or compression molded or cast about the mantle layer.

In the manufacturing of the ball, the core is preferably compression molded as stated above. The mantle layer is molded over the core using a retractable-pin mold or a fixed-pin mold. In a fixed-pin mold, a plurality of apertures are formed in the mantle layer for forming a mechanical interlock with the cover. The cover is molded over the mantle layer and a portion flows into the apertures to form the interlock.

Illustrated in Table VII are a number of batch formulations for several mantle layer compositions of the present invention, as well as properties such as hardness (Shore D), Bashore resilience, flexural modulus, % strain at break and tensile modulus for each composition.

The following examples of batch compositions are given to illustrate the novel multi-layer golf balls of the present invention. However, it is to be understood that the examples are only for illustrative purposes and in no manner is the present invention limited to the specific disclosures therein.

TABLE VII

Mantle Layer Compositions and Properties

| Sample | | Hardness (Shore D) | Resilience | Flex Modulus (psi) | Tensile Modulus (psi) | % Strain at Break |
|---|---|---|---|---|---|---|
| 1A | 0% Hytrel 5556<br>100% Hytrel 3078 | 30 | 62 | 4,000 | 2,078 | 810 no break |
| 1B | 25% Hytrel 5556<br>75% Hytrel 3078 | 37 | 59 | 8,170 | 5,122 | 685 |
| 1C | 50% Hytrel 5556<br>50% Hytrel 3078 | 44 | 55 | 15,320 | 10,879 | 590 |
| 1D | 75% Hytrel 5556<br>25% Hytrel 3078 | 53 | 50 | 19,870 | 16,612 | 580 |
| 1E | 100% Hytrel 5556<br>0% Hytrel 3078 | 58 | 50 | 24,840 | 17,531 | 575 |
| 2A | 0% Estane 58091<br>100% Estane 58861 | 28 | 54 | 1,720 | 756 | 563 |
| 2B | 25% Estane 58091<br>75% Estane 58861 | 34 | 41 | 2,610 | 2,438 | 626 |
| 2C | 50% Estane 58091<br>50% Estane 58861 | 44 | 31 | 10,360 | 10,824 | 339 |
| 2D | 75% Estane 58091<br>25% Estane 58861 | 61 | 34 | 43,030 | 69,918 | 149 |
| 2E | 100% Estane 58091<br>0% Estane 58861 | 78 | 46 | 147,240 | 211,288 | 10 |
| 3A | 0% Hytrel 5556<br>100% Hytrel 4078 | 40 | 51 | 9,250 | 7,071 | 527 |
| 3B | 25% Hytrel 5556<br>75% Hytrel 4078 | 43 | 51 | 10,020 | 9,726 | 441 |
| 3C | 50% Hytrel 5556<br>50% Hytrel 4078 | 45 | 47 | 12,280 | 10,741 | 399 |
| 3D | 75% Hytrel 5556<br>25% Hytrel 4078 | 48 | 53 | 13,680 | 13,164 | 374 |
| 3E | 100% Hytrel 5556<br>0% Hytrel 4078 | 48 | 52 | 12,110 | 15,231 | 347 |
| 4A | 0% Hytrel 4078<br>100% Pebax 4033 | 46 | 51 | 11,150 | 8,061 | 597 |
| 4B | 25% Hytrel 4078<br>75% Pebax 4033 | 46 | 53 | 10,630 | 7,769 | 644 |
| 4C | 50% Hytrel 4078<br>50% Pebax 4033 | 45 | 52 | 9,780 | 8,117 | 564 |
| 4D | 75% Hytrel 4078<br>25% Pebax 4033 | 42 | 53 | 9,310 | 7,996 | 660 |
| 4E | 100% Hytrel 4078<br>0% Pebax 4033 | 40 | 51 | 9,250 | 7,071 | 527 |
| 5A | 0% Hytrel 3078<br>100% Estane 5809 | 77 | 50 | 156,070 | 182,869 | 9 |
| 5B | 25% Hytrel 3078<br>75% Estane 5809 | 65 | 48 | 87,680 | 96,543 | 33 |
| 5C | 50% Hytrel 3078<br>50% Estane 5809 | 52 | 49 | 53,940 | 48,941 | 102 |
| 5D | 75% Hytrel 3078<br>25% Estane 5809 | 35 | 54 | 12,040 | 6,071 | 852 |
| 5E | 100% Hytrel 3078<br>0% Estane 5809 | 30 | 62 | 4,000 | 2,078 | 810 no break |
| 6A | 100% Kraton 1921<br>0% Estane 58091<br>0% Surlyn 7940 | 29 | 59 | 24,300 | 29,331 | 515 |
| 6B | 50% Kraton 1921<br>50% Estane 58091<br>0% Surlyn 7940 | 57 | 49 | 56,580 | — | 145 |
| 6C | 50% Kraton 1921<br>0% Estane 58091<br>50% Surlyn 7940 | 56 | 55 | 28,290 | 28,760 | 295 |
| 7A | 33.3% Pebax 4033<br>33.3% Estane 58091<br>33.3% Hytrel 3078 | 48 | 50 | 41,240 | 30,032 | 294 |

TABLE VII-continued

Mantle Layer Compositions and Properties

| Sample | | Hardness (Shore D) | Resilience | Flex Modulus (psi) | Tensile Modulus (psi) | % Strain at Break |
|---|---|---|---|---|---|---|
| 7B | 50% Pebax 4033<br>40% Estane 58091<br>10% Hytrel 3078 | 48 | 50 | 30,650 | 14,220 | 566 |
| 7C | 20% Pebax 4033<br>40% Estane 58091<br>40% Hytrel 3078 | 41 | 54 | 24,020 | 16,630 | 512 |

Tables VIII and IX provide test data obtained from balls having soft mantle layers. In particular, the spin rate and velocity were measured for golf balls formed according to the present invention. In the first ball, the mantle layer was Hytrel 3078, the cover was a conventional lithium/high acid sodium SURLYN® 50/50 blend (SURLYN 7940/SURLYN 8140) and the core was a conventional cross-linked polybutadiene core. In the second ball, the mantle layer was Hytrel 3078, the cover was high acid lithium/standard zinc 50/50 blend (SURLYN® SEP 671/SURLYN® 9910) and the core was a polybutadiene core with 2.13 pph calcium oxide. Both cores had a diameter of 1.39 inches and a specific gravity of about 1.25. The mantle layers were 0.06 inches thick and the covers were 0.085 inches thick. Also tested were conventional two piece golf balls (Titleist HVC 90 and Pinnacle Gold) for comparison. Each ball was tested in a True Temper Test Machine. The test machine was configured to strike the balls with a Driver and an Eight Iron.

TABLE VIII

Spin Rate Test Results for Driver

| Sample | Launch Angle | Spin (rpm) | Velocity (ft/sec) | Compression |
|---|---|---|---|---|
| Titleist HVC (control) | 9.3° | 3038 | 234.9 | 100 |
| Pinnacle Gold (control) | 9.3° | 3027 | 233.6 | 97 |
| SURLYN ® 7940/SURLYN ® 8140 cover, Hytrel 3078 mantle layer, and 1.39" polybutadiene core | 9.1° | 3066 | 234.7 | 92 |
| SURLYN ® SEP 671/ SURLYN ® 9910 cover, Hytrel 3078 mantle layer, and 1.39" polybutadiene core with calcium oxide | 9.1° | 2900 | 233.3 | 79 |

TABLE IX

Spin Rate Test Results for 8-Iron

| Sample | Launch Angle | Spin (rpm) | Velocity (ft/sec) |
|---|---|---|---|
| Titleist HVC (control) | 19.5° | 7690 | 166.1 |
| Pinnacle Gold (control) | 19.8° | 7549 | 165.4 |
| SURLYN ® 7940/SURLYN ® 8140 cover, Hytrel 3078 mantle layer, and 1.39" polybutadiene core | 20.2° | 7326 | 167.9 |
| SURLYN ® SEP 671/SURLYN ® 9910 cover, Hytrel 3078 mantle layer, and 1.39" polybutadiene core with calcium oxide | 19.3° | 7115 | 168.9 |

As shown by test data above, golf balls having a low modulus mantle layer, like Hytrel 3078, have a high initial velocity and low spin rate for good distance. Moreover, the ball having calcium oxide in the core composition has a very soft "feel", more like a wound ball. Still further, these balls are easy to manufacture compared to the conventional wound ball. Thus, these balls provide the advantages of two piece balls with low spin rates, high velocity and soft "feel".

It will be understood that the claims are intended to cover all changes and modifications of the preferred embodiments of the invention, herein chosen for the purpose of illustration, which do not constitute a departure from the spirit and scope of the invention.

What is claimed is:

1. A multi-layer golf ball comprising:

a core;

a cover layer; and a mantle layer disposed between the core and the cover, wherein the cover layer consists essentially of two or more ionomer resins, including a first resin being a copolymer of 16 to 35% by weight of an alpha, beta-unsaturated carboxylic acid and 84 to 65% by weight of an olefin, wherein about 10 to about 90% of the carboxyl groups of the copolymer are neutralized with a metal ion and a second resin being a terpolymer of 9 to 12% by weight of an alpha, beta-unsaturated carboxylic acid, 1 to 50% by weight n-alkyl acrylate or methacrylate and 38 to 90% by weight of an olefin, wherein about 10 to about 90% of the carboxyl groups of the terpolymer are neutralized with a metal ion; and wherein the mantle layer comprises a thermoplastic material, said thermoplastic material consisting essentially of polyetherester block copolymer; and wherein the mantle layer has a specific gravity of greater than 1.2.

2. The golf ball of claim 1, wherein the olefin is ethylene in both the first and second resins.

3. The golf ball of claim 1, wherein the cover layer further consists essentially of a third ionomer resin, said third ionomer resin comprising a copolymer of 13 to 15% by weight of an alpha, beta-unsaturated carboxylic acid and an olefin, wherein about 10 to about 90% of the carboxyl groups of the copolymer are neutralized with a metal ion.

4. The golf ball of claim 3, wherein the first ionomer resin is present in an amount greater than about 40 parts by weight of the cover layer, the second ionomer resin is present in an amount of less than about 15 parts by weight of the cover layer and the third ionomer resin is present in an amount of greater than about 40 parts by weight of the cover layer.

5. The golf ball of claim 1 wherein the core comprises polybutadiene, a metal salt diacrylate or dimethacrylate, a free radical inhitiator, and calcium oxide.

6. A multi-layer golf ball comprising:

a core;

a cover layer; and a mantle layer disposed between the core and the cover;

wherein the cover layer is formed of a composition comprising: (1) greater than about 40 parts by weight of a first ionomer resin being a copolymer of 16 to 35 percent by weight of an alpha, beta-unsaturated carboxylic acid and 84 to 65 percent by weight of an olefin, wherein about 10 to about 90 percent of the carboxyl groups of the copolymer are neutralized with a metal ion; (2) greater than 40 parts by weight of a second ionomer resin being a copolymer of 13 to 15 percent by weight of an alpha, beta-unsaturated carboxylic acid and an olefin, wherein about 10 to about 90 percent of the carboxyl groups of the copolymer are neutralized with a metal ion; and (3) about 2 to about 15 parts by weight of a third ionomer resin being a terpolymer of 9 to 12 percent by weight of an alpha, beta-unsaturated carboxylic acid, 1 to 50 percent by weight n-alkyl acrylate or methacrylate and 38 to 90 percent by weight of an olefin, wherein about 10 to about 90 percent of the carboxyl groups of the terpolymer are neutralized with a metal ion.

7. The golf ball of claim 6 wherein the core comprises polybutadiene, a metal salt diacrylate or dimethacrylate, a free radical inhitiator, and calcium oxide.

8. The golf ball of claim 6 wherein the mantle layer comprises a thermoplastic material, said thermoplastic material consisting essentially of polyetherester block copolymer.

9. The golf ball of claim 6 wherein the first ionomer resin has a flexural modulus of greater than about 70,000 psi; the second ionomer resin has a flexural modulus of greater than about 60,000 psi, and the third ionomer resin has a flexural modulus of less than about 20,000 psi.

10. The golf ball of claim 6 wherein the first ionomer resin comprises a copolymer of ethylene and more than 16% by weight methacrylic acid, wherein about 10 to about 90% of the carboxyl groups of the copolymer are neutralized with a metal ion.

11. The golf ball of claim 10 wherein the first ionomer resin comprises about 19% by weight methacrylic acid.

12. The golf ball of claim 6 wherein the second ionomer resin is a copolymer of ethylene and 13 to less than 16% by weight methacrylic acids, wherein about 10 to about 90% of the carboxyl groups of the copolymer are neutralized with a metal ion.

13. The golf ball of claim 12 wherein the second ionomer resin comprises about 15% methacrylic acid.

14. The golf ball of claim 6 wherein the third ionomer resin is a terpolymer of ethylene, - or iso-alkyl acrylate or methacrylate and 10 to less than 13% methacrylic acid, wherein about 10 to about 90% of the carboxyl groups of the copolymer are neutralized with a metal ion.

15. The golf ball of claim 14 wherein the third ionomer resin is comprised of a sodium ionomer, a zinc ionomer, or mixtures thereof.

16. The golf ball of claim 15 wherein the third ionomer resin is a terpolymer of ethylene, methacrylic acid, and - or iso-butyl acrylate neutralized with sodium ion.

17. The golf ball of claim 1 or 6, wherein the thickness of the mantle layer is from about 0.025 inches to about 0.125 inches.

18. The golf ball of claim 1 or 6, wherein the diameter of the core is about 1.30 inches to about 1.45 inches.

19. The golf ball of claim 1 or 6, wherein the mantle layer has a Bayshore resilience of about 35 to about 70, and the core has a Bayshore resilience of about 40 to about 60.

20. The golf ball of claim 1 or 6, wherein the mantle has a flex modulus of about 500 psi to about 50,000 psi.

21. A multi-layer golf ball comprising:

a core;

a cover layer; and a mantle layer disposed between the core and the cover;

wherein the cover layer consists essentially of three ionomer resins, including a first ionomer resin being a copolymer of 16 to 35 percent by weight of an alpha, beta-unsaturated carboxylic acid and 84 to 65 percent by weight of an olefin, wherein about 10 to about 90 percent of the carboxyl groups of the copolymer are neutralized with a metal ion; a second ionomer resin being a copolymer of 13 to 15 percent by weight of an alpha, beta-unsaturated carboxylic acid and an olefin, wherein about 10 to about 90 percent of the carboxyl groups of the copolymer are neutralized with a metal ion; and a third ionomer resin being a terpolymer of 9 to 12 percent by weight of an alpha, beta-unsaturated carboxylic acid, 1 to 50 percent by weight n-alkyl acrylate or methacrylate and 38 to 90 percent by weight of an olefin, wherein about 10 to about 90 percent of the carboxyl groups of the terpolymer are neutralized with a metal ion; and wherein the first ionomer resin is present in an amount greater than about 40 parts by weight of the cover layer, the second ionomer resin is present in an amount of greater than about 40 parts by weight of the cover layer and the third ionomer resin is present in an amount of less than about 15 parts by weight of the cover layer; and wherein the mantle layer comprises a thermoplastic material, the thermoplastic material consisting essentially of polyetherester block copolymer.

22. The golf ball of claim 21, wherein the olefin is ethylene in both the first and third ionomer resins.

23. The golf ball of claim 21 wherein the core comprises polybutadiene, a metal salt diacrylate or dimethacrylate, a free radical initiator, and calcium oxide.

\* \* \* \* \*